Jan. 12, 1971   F. J. ADAMS   3,554,048
THREE POINT RACK BAR SUPPORT FOR RACK AND PINOIN ASSEMBLY
Filed July 8, 1969
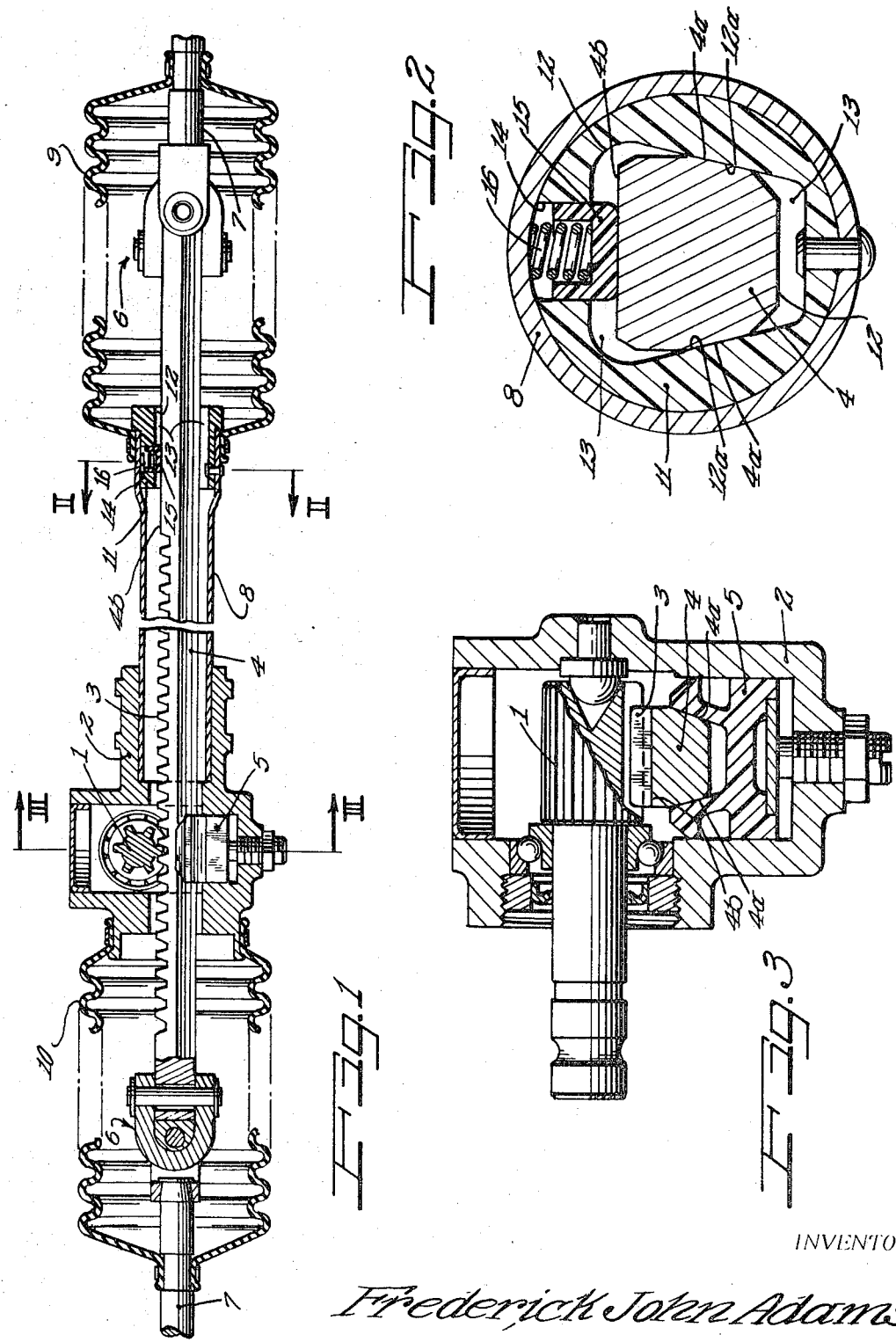
INVENTOR.
Frederick John Adams
BY ......... ATTORNEYS

United States Patent Office 3,554,048
Patented Jan. 12, 1971

3,554,048
THREE POINT RACK BAR SUPPORT FOR RACK AND PINION ASSEMBLY
Frederick J. Adams, Campton, near Shefford, England, assignor to Cam Gears Limited, Hertfordshire, England, a British company
Filed July 8, 1969, Ser. No. 839,866
Claims priority, application Great Britain, Aug. 30, 1968, 41,437/68
Int. Cl. B62d 1/20
U.S. Cl. 74—498    10 Claims

ABSTRACT OF THE DISCLOSURE

A rack and pinion assembly especially suitable for automotive steering gear having a rack bar slidably supported on two laterally spaced converging surfaces, and urged against said surfaces by a third support. The rack bar preferably is slidably mounted in a pinion housing adjacent one end, extends through a tube projecting from the pinion housing, and is slidably mounted adjacent its other end by a plastic bearing secured in the tube having a wedge-shaped recess with converging sidewalls engaging opposite sides of the rack bar and slidably supporting a spring-urged plastic plug engaging the rack bar between the inclined surfaces to urge the bar deeper into the recess. The plastic bearing support is mounted in the end of the tube remote from the pinion housing.

BACKGROUND OF THE INVENTION

Field of the invention

This invention pertains to the art of rack and pinion assemblies especially suitable for use in steering gear for automotive vehicles, and particularly is concerned with the supporting of the rack bars of such assemblies to provide damping against shock forces, to prevent rattling, to reduce manufacturing costs, and to simplify installation.

Description of the prior art

Rack bars of rack and pinion assemblies for steering gear are conventionally supported in tubular bearings or packings provided in the extremities of housings receiving the bar therethrough. An example of such prior art arrangements is shown in the expired Dahlen U.S. Pat. 1,332,161 dated Feb. 24, 1920. As there shown, the intermediate portion of the rack bar slides on a flat surface, while the extremities of the rack bar extend through and are supported by reduced ends of the housing and end caps on the housing ends. These arrangements are expensive, have no self-adjusting features, and do not provide for wear take-up.

SUMMARY OF THE INVENTION

According to this invention there is provided a rack and pinion assembly wherein the rack bar is slidably supported on three surfaces cooperating to form a firm bearing seat slidably carrying the rack bar for longitudinal movement while holding it against lateral movement, and at the same time accommodating wide variations in rack bar sizes and shapes and automatically taking up wear to prevent looseness during extensive usage.

The preferred rack bar support of this invention is composed of plastic of a semi-rigid nature such as, for example, nylon, polyurethane, and acetal resins such as "Delrin" (a trademark of Du Pont de Nemours & Co.).

The rack and pinion assemblies of this invention include a pinion rotatably mounted in a pinion housing, a rack bar linearly movable in a longitudinal direction through the pinion housing and through a rack bar housing which extends from the pinion housing, and a rack on the rack bar which operatively engages the pinion so that rotation of the pinion effects movement of the rack bar longitudinally through the housing.

In the present invention the rack bar support member is located in the rack bar housing and secured thereto. This support member has an aperture through which the rack bar extends. The aperture is so shaped that clearance is provided between the support member and rack bar, and so that the rack bar slidably engages with the support member at at least two laterally-spaced positions. The support member carries a resiliently mounted damper which slidably abuts the rack bar and urges it laterally into engagement with the support member at at least the two laterally-spaced positions whereby the rack bar is laterally located and supported in the housing within this support member.

Preferably the rack bar is of polygonal shape in lateral cross-section and has at least three longitudinally extending side faces which define, or partly define, the parameters of a substantially triangular shape in lateral section and the damper is located to abut one of the side faces and the rack bar slidably engages with the support member at two spaced positions located one on each of the other two side faces. In a preferred construction the damper is located to abut a side face of the rack bar in which the rack is located and the rack bar is of "wedge-shape" in lateral section and has a pair of opposed longitudinally extending side faces which converge from the side face of the rack bar in which the rack is located and slidably engage one with each of two opposing side faces in the support member which partly define the aperture in the support member which aperture is of substantially complementary shape to, but of slightly larger dimensions than, the periphery in lateral section of the rack bar.

The plastic support member may be secured to the rack bar housing by a rivet, by bonding, or by an interference fit.

The resiliently mounted damper is preferably a pad of plastic material housed in the wall of the support member and spring-loaded to be urged into engagement with the rack bar. The pad may be of the same plastics composition as the support member.

In addition to providing support for the rack bar, the resilience of the material when provided for the support member and the resiliently mounted damper provide efficient damping against shock forces which may result on the rack bar during use of the assembly and, in addition, effectively provide an anti-rattle construction. If required two or more rack bar support members may be provided in a rack and pinion assembly.

It is then an object of this invention to provide a rack and pinion assembly in which the rack bar is slidably supported adjacent one end in a pinion housing, extends through a tube projecting from the pinion housing, and is slidably supported at its opposite end by a plastic, wedge-shaped bearing secured in the end of the tube remote from the pinion housing.

Another object of this invention is to provide a rack and pinion assembly with a three point rack bar support.

A further object of this invention is to provide a rack and pinion assembly in which the rack bar is supported during its longitudinal movement through its housing by a plastic bearing effective to dampen against shock forces, to prevent rattling, and to take up wear during use.

A further object of the invention is to provide a rack and pinion assembly with a polygonal rack bar having converging side surfaces seated in the wedge-shaped recess of a plastic bearing, and having a third surface engaged by a spring-loaded damper plug slidably mounted in the plastic bearing and urging the rack bar deeper into the wedge-shaped recess.

A still further object of this invention is to provide a rack and pinion assembly for automotive steering gear, which assembly has a pinion housing and a rack bar housing extending from the pinion housing wherein the rack bar slidably supported at one end in the wedge-shaped recess of a plastic carrier member aligned with the pinion in the housing, and is supported at its other end in the wedge-shaped recess of another plastic bearing secured in the end of the rack bar housing remote from the pinion housing.

Other and further objects, features and advantages of the invention will be readily apparent from the following description of a preferred embodiment thereof, taken in conjunction with the accompanying drawing, although variations and modifications may be effected without departing from the spirit and scope of the novel concepts of the disclosure.

BRIEF DESCRIPTION OF THE DRAWING

FIG. 1 is a longitudinal cross-sectional view, with parts in elevation, and with the central portion broken away, of a steering gear including a rack and pinion assembly having a support member constructed in accordance with the present invention;

FIG. 2 is a lateral cross-sectional view taken along the line II—II of FIG. 1;

FIG. 3 is a lateral cross-sectional view taken along the line III—III of FIG. 1.

DESCRIPTION OF THE PREFERRED EMBODIMENT

The vehicle steering gear of FIG. 1 includes a pinion 1 which operatively engages in a pinion housing 2, with a rack 3 of rack bar 4. The rack 3 is located in a side face 4b of the rack bar 4 which is of trapezoidal or keystone-wedge shape in lateral section to have longitudinally extending opposed side faces 4a (as shown in FIGS. 2 and 3, which converge from the side face or top 4b. The side faces 4a and 4b partly define the parameters of a substantially triangular shape in lateral section.

As shown in FIG. 3, the rack bar 4 is slidably supported in the pinion housing 2 for longitudinal movement therethrough by a plastic carrier member 5 having a wedge-shaped recess with side walls engaging the side faces 4a of the rack bar. The carrier member 5 is conveniently constructed in accordance with my co-pending U.S. patent application Ser. No. 839,957, filed of even date herewith.

The free ends of the rack bar 4 are connected through universal coupling 6 to tie rods 7.

The rack bar 4 is housed for part of its axial length in a substantially cylindrical rack bar housing 8 which housing may be an integral extension of the pinion housing 2 or, as in the present example, a tubular member which is connected in sealed manner at one end to the pinion housing 2 and at the other end to bellows 9 which connects with a tie rod 7. The part of the rack bar 4 which emerges from the side of the pinion housing 2 remote from the housing 8 is enclosed in bellows 10 provided between the pinion housing and its adjacent tie rod 7. Consequently the rack bar is enclosed for the whole of its length in a sealed chamber.

The end of the rack bar housing 8 remote from the pinion housing 2 is diametrically enlarged to provide a socket which houses a support member 11 of semi-rigid material, for example, polyurethane. The support member 11 has a longitudinally extending aperture 12 and is fixedly secured in the housing 8, for example, by a rivet 11a.

The aperture 12 is of substantially trapezoidal form in lateral section and is partly defined by a pair of longitudinally extending opposed faces 12a which converge to correspond with the convergent faces 4a of the rack bar 4. The rack bar 4 passes through the aperture 12 and its side faces 4a slidably engage with the faces 12a of the support member as shown in FIG. 2. The rack bar 4 defines with the support member 11 longitudinally extending passages 13. As mentioned above, the rack bar housing 8 and bellows 9 and 10 provide a closed chamber within which the rack bar 4 slides. Usually this chamber is filled with oil and the passages 13 permit passage of the oil between the bellows 9 and 10 during operation of the steering gear.

Mounted in an aperture 14 provided in the wall of the support member 11 is a pad 15 of semi-rigid plastics material which is laterally slidable within the aperture 14 and is spring loaded at 16 against the rack bar housing 8 to be urged into abutment with the rack bar 4. The pad 15 abuts the rack bar 4 on its side face 4b and urges the side faces 4a of the rack bar into engagement with their respectively adjacent faces 12a on the support member.

Contact between the surfaces 12a and 4a and the abutment between the pad 15 and the rack bar effectively provides a three point contact which locates the rack bar centrally in its housing and supports the rack bar during its longitudinal movement. The resilient mounting provided by the material of the support member 11 and the spring loading of pad 15 provides damping of the rack bar against shock forces which may be applied thereto and also serves to provide an anti-rattle construction.

I claim as my invention:

1. A rack and pinion assembly including a housing rotatably supporting a pinion and having a rack bar projecting through the housing at right angles to the pinion axis and with a rack in meshed engagement with the pinion, a first plastic carrier in the housing having a wedge-shaped recess slidably supporting the rack bar opposite the pinion, a tube projecting from the housing receiving the rack bar therethrough, a second plastic carrier secured in the end of the tube remote from the pinion housing, said second carrier having a wedge-shaped recess slidably receiving the rack bar, and a spring-pressed plastic plug slidably engaging the rack bar and urging the same deeper into the wedge-shaped recess of the second carrier, said first carrier co-acting with said pinion to provide three point bearing support for one end of the rack bar, and said spring-pressed plug co-acting with the second carrier to provide three point support for the other end of the rack bar.

2. A vehicle steering gear linkage comprising a rack and pinion housing, a pinion rotatably mounted in the housing, a rack bar slidable through the housing, a rack on said rack bar meshed with said pinion in the housing, a tube projecting from one end of said housing receiving said rack bar therethrough, tie rods coupled to the ends of the rack bar beyond the tube and housing respectively, said rack bar having a trapezoidal cross-section with a flat top and converging sidewalls, a first plastic carrier in said housing, a second plastic carrier in the end of said tube remote from said housing, said plastic carriers having wedge-shaped recesses with tapered sidewalls slidably supporting the converging sidewalls of the rack bar, adjustable means carried by said pinion housing acting on the first plastic carrier to force the rack bar deeper into the wedge-shaped recess thereof for maintaining an interference fit with the rack bar, said second carrier having a spring-loaded plug associated therewith engaging the flat top wall of the rack bar to urge the rack bar deeper into the wedge-shaped recess of the second carrier, a first bellows embracing the end of the rack bar projecting from the housing having one end secured to the housing and the other end secured to the adjacent tie rod, a second bellows embracing the end of the rack bar projecting from the tube having a first end secured to the tube and a second end secured to the adjacent tie rod and passageways between the rack bar and second carrier accommodating grease flow between the tube and second bellows.

3. A rack and pinion assembly having a tube receiving a rack bar therethrough, a support member in the end of said tube having an aperture through which the rack bar extends, said aperture having sidewalls converging to laterally support opposite sides of the rack bar at at least two laterally spaced positions, and a resiliently mounted damper carried by said support member slidably abutting said rack bar and urging said bar into engagement with the sidewalls of the support member to laterally locate and support the rack bar in the rack bar tube.

4. The rack and pinion assembly of claim 3 wherein the support member is composed of resilient plastic material.

5. The rack and pinion assembly of claim 3 wherein the rack bar has at least three longitudinally extending side faces defining the perimeter of a substantially triangular shape in lateral section, and wherein the damper is located to abut one of the side faces to urge the other two side faces into sliding contact with the support member.

6. The rack and pinion assembly of claim 3 wherein the damper is located to abut a side face of the rack bar in which the rack is located, the rack bar has a pair of longitudinally extending side faces converging from said side face and the damper urges said converging side faces into slidable engagament with the sidewalls of the support member.

7. The rack and pinion assembly of claim 3 wherein the resiliently mounted damper is a plastic pad slidably mounted in the wall of the support member overlying the rack bar.

8. A plastic support bearing for the rack bar of a rack and pinion assembly which comprises a tubular sleeve having an aperture therethrough with top and bottom walls and sidewalls converging from the top wall toward the bottom wall, said top wall having an aperture therethrough, a plug slidably mounted in said aperture, and means urging the plastic plug into the aperture whereby a rack bar slidably mounted in the aperture will be urged in the direction of convergence of the aperture sidewalls to maintain an interference fit therewith.

9. The support of claim 8 wherein the aperture is larger than the rack bar to provide grease passageways through the sleeve around the rack bar.

10. The support of claim 8 wherein the aperture is trapezoidal-shaped.

References Cited

FOREIGN PATENTS

| 776,052 | 6/1957 | Great Britain | 74—422 |
| 892,683 | 3/1962 | Great Britain | 74—498 |
| 946,501 | 1/1964 | Great Britain | 74—498 |

MILTON KAUFMAN, Primary Examiner

U.S. Cl. X.R.

74—409, 422; 280—96